(12) United States Patent
Lee

(10) Patent No.: US 11,355,770 B2
(45) Date of Patent: Jun. 7, 2022

(54) APPARATUS AND METHOD FOR MANUFACTURING MEMBRANE-ELECTRODE ASSEMBLY OF FUEL CELL

(71) Applicants: HYUNDAI MOTOR COMPANY, Seoul (KR); KIA CORPORATION, Seoul (KR)

(72) Inventor: Jin Won Lee, Boryeong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/378,016

(22) Filed: Jul. 16, 2021

(65) Prior Publication Data

US 2021/0344028 A1 Nov. 4, 2021

Related U.S. Application Data

(62) Division of application No. 16/425,251, filed on May 29, 2019, now Pat. No. 11,094,955.

(30) Foreign Application Priority Data

Nov. 9, 2018 (KR) .................. 10-2018-0137342

(51) Int. Cl.
*H01M 8/1004* (2016.01)
*B32B 37/00* (2006.01)

(52) U.S. Cl.
CPC ....... *H01M 8/1004* (2013.01); *B32B 37/0053* (2013.01); *B32B 2457/18* (2013.01)

(58) Field of Classification Search
CPC . B32B 37/0053; B32B 2457/18; B32B 41/00; B32B 2041/04; B32B 2041/06; B32B 2309/08; B32B 2309/10; B32B 2309/105; B32B 2309/12; H01M 8/1004; H01M 4/88; H01M 10/0585
See application file for complete search history.

(56) References Cited

U.S. PATENT DOCUMENTS

| | | | |
|---|---|---|---|
| 2002/0174782 A1* | 11/2002 | Klug | B44B 5/0047 101/3.1 |
| 2010/0051181 A1* | 3/2010 | Mori | H01M 4/8896 156/390 |
| 2010/0167176 A1* | 7/2010 | Kawai | H01M 4/8896 156/60 |
| 2018/0337410 A1* | 11/2018 | Lee | H01M 8/1004 |

* cited by examiner

*Primary Examiner* — George R Koch
(74) *Attorney, Agent, or Firm* — Lempia Summerfield Katz LLC

(57) ABSTRACT

Disclosed is a method of the apparatus for manufacturing a membrane-electrode assembly for a fuel cell. The method includes: (a) unwinding an electrolyte membrane sheet from an electrolyte membrane sheet roll, recovering a protect film attached on an electrolyte membrane, and supplying the electrolyte membrane along a set feed path; (b) unwinding a first electrode film sheet including a first electrode film continuously coated with an anode electrode layer and a second electrode film sheet including a second electrode film coated with a cathode electrode layer with a predetermined gap, and supplying the first electrode film sheet and the second electrode film sheet along the set feed path; (c) passing the electrolyte membrane and the first and second electrode film sheets through between a driving bonding roll and a driven bonding roll.

6 Claims, 7 Drawing Sheets

APPARATUS AND METHOD FOR MANUFACTURING MEMBRANE-ELECTRODE ASSEMBLY OF FUEL CELL

CROSS-REFERENCE TO RELATED APPLICATION

This application is a divisional application of non-provisional U.S. patent application Ser. No. 16/425,251, filed on May 29, 2019, now U.S. Pat. No. 11,094,955 B2, which claims priority to and the benefit of Korean Patent Application No. 10-2018-0137342, filed on Nov. 9, 2018, the entire contents of which are incorporated herein by reference.

FIELD

An exemplary form of the present disclosure relates to a system for manufacturing parts of a fuel cell stack. More particularly, the present disclosure relates to an apparatus and a method for manufacturing a membrane-electrode assembly for a fuel cell.

BACKGROUND

The statements in this section merely provide background information related to the present disclosure and may not constitute prior art.

As is known, fuel cells produce electricity through an electrochemical reaction between hydrogen and oxygen. Fuel cells may continuously generate electric power upon receiving a chemical reactant from the outside, even without a separate charging process.

A fuel cell may be formed by disposing separators (or bipolar plates) on both sides of a membrane-electrode assembly (MEA) intervening therebetween. A plurality of fuel cells may be continuously arranged to form a fuel cell stack.

Here, a membrane-electrode assembly is a core component of the fuel cell and has a three-layer structure: an electrolytic membrane in which hydrogen ions transfer, an anode catalyst electrode layer formed on one surface of the electrolytic membrane, and a cathode catalyst electrode layer formed on the other surface of the electrolytic membrane. As a method of manufacturing the three-layer structure membrane-electrode assembly, a direct coating method and a decal method may be used.

Among them, in the case of the decal method, an electrode film coated with each catalyst electrode layer is deposited on both surfaces of the electrolyte membrane, the catalyst electrode layer is transferred to both surfaces of the electrolyte membrane to be joined, and then the electrode film is removed, thereby manufacturing the membrane-electrode assembly of a three-layer structure.

That is, in the manufacturing process of the membrane-electrode assembly using the decal method, an electrode film of a roll type coated with each catalyst electrode layer and an electrolyte membrane of a roll type pass a bonding roll of high temperature and high pressure to be laminated (thermally compressed), and the electrode film is removed to manufacture the membrane-electrode assembly of the three-layer structure.

As described above, in the process of manufacturing the membrane-electrode assembly of the three-layer structure by the decal method using the roll laminating process, since a manufacturing speed may be improved, there are advantages in mass production.

However, in the decal method using the roll lamination process, in the state that the electrode film coated with each catalyst electrode layer on both sides via the electrolyte membrane interposed therebetween is positioned, since they pass between the bonding rolls of high temperature and high pressure and the catalyst electrode layer and the electrolyte membrane are laminated in the directions such that they contact each other, it is difficult to align the lamination positions of the anode catalyst electrode layer and the cathode catalyst electrode layer.

We have discovered that the electrode film and the electrolyte membrane continuously pass between the bonding rolls of high temperature and high pressure that are always pressed and the catalyst electrode layer is laminated on both surfaces of the electrolyte membrane, and in this roll laminating continuous process, it is difficult to correctly accord the lamination positions of the catalyst electrode layers by a feeding speed difference of the electrode film.

Also, we have found that the lamination positions of the anode catalyst electrode layer and the cathode catalyst electrode layer are difficult to align because a pitch between the catalyst electrode layers is not constant in the process of manufacturing the catalyst electrode layer of the continuous patterns by coating the catalyst slurry to the electrode film.

The above information disclosed in this Background section is only for enhancement of understanding of the background of the present disclosure and therefore it may contain information that does not form the prior art that is already known to a person of ordinary skill in the art.

SUMMARY

The present disclosure provides an apparatus and a method for manufacturing a membrane-electrode assembly for a fuel cell, which can align the transfer positions of the anode and the cathode electrode layers on both sides of the electrolyte membrane in a simple configuration.

In one form of the present disclosure, a manufacturing apparatus of a membrane-electrode assembly for a fuel cell may include: an electrode film sheet supply unit supplying a first electrode film sheet including a first electrode film continuously coated with an anode layer and a second electrode film sheet including a second electrode film coated with a cathode layer with a predetermined gap along a set feed path respectively; an electrolyte membrane sheet supply unit recovering a protect film from an electrolyte membrane sheet including the protect film on a surface of electrolyte membrane, and supplying the electrolyte membrane between the anode layer of the first electrode film sheet and the cathode layer of the second electrode film sheet along the set feed path; a drive bonding roll disposed on the set feed path, rotatable by an operation of a first driver, and the drive bonding roll of which an engraved portion and an embossing portion are formed alternately on a circumference thereof; and a driven bonding roll disposed to a corresponding position of the drive bonding roll, movable closer to or farther away from the drive bonding roll by an operation of a second driver; and the driven bonding roll pressing the electrolyte membrane and the first and second electrode film sheets with the drive bonding roll, and wherein the driven bonding roll is moved away from the drive bonding roll by the operation of the second driver and a relative rotation position of the drive bonding roll with respect to the driven bonding roll is adjusted by the operation of the first driver based on the arrangement of the predetermined gap of the cathode layer.

The electrolyte membrane sheet supply unit may supply the electrolyte membrane sheet from an electrolyte membrane sheet roll, and in both ends of the electrolyte membrane sheet, a first extension film may be attached to both ends of the electrolyte membrane and a second extension film may be attached to both ends of the protect film.

The electrolyte membrane sheet may be connected with another electrolyte membrane sheet through connecting films connecting the first extension films and the second extension films of the electrolyte membrane sheet and the another electrolyte membrane sheet respectively.

The electrolyte membrane sheet supply unit may include an electrolyte membrane sheet unwinder of which the electrolyte membrane sheet roll is wounded thereto for unwinding the electrolyte membrane sheet and a protect film rewinder for recovering the protect film from the electrolyte membrane sheet and winding the protect film in a roll form.

The manufacturing apparatus may further include: separation blades disposed on the set feed path rear of the drive bonding roll and driven bonding roll and separating the first electrode film from the anode electrode layer, and the second electrode film from the cathode electrode layer; electrode film rewinders for recovering the first electrode film and the second electrode film respectively; and a membrane-electrode assembly rewinder winding the membrane-electrode assembly having the anode electrode layer and the cathode electrode layer bonded to the surfaces of the electrolyte membrane by the driving bonding roll and the driven bonding roll respectively.

A manufacturing apparatus of a membrane-electrode assembly for a fuel cell according to an exemplary form of the present disclosure may include: an electrode film sheet supply unit supplying a first electrode film sheet including a first electrode film continuously coated with an anode layer and a second electrode film sheet including a second electrode film coated with a cathode layer with a predetermined gap along a set feed path respectively; an electrolyte membrane sheet supply unit supplying the electrolyte membrane between the anode layer of the first electrode film sheet and the cathode layer of the second electrode film sheet along the set feed path; a drive bonding roll disposed on the set feed path, rotatable by an operation of a first driver, and the drive bonding roll of which an engraved portion and an embossing portion are formed alternately on a circumference thereof; a driven bonding roll disposed to a corresponding position of the drive bonding roll, movable closer to or farther away from the drive bonding roll by an operation of a second driver, where the driven bonding roll presses the electrolyte membrane and the first and second electrode film sheets with the drive bonding roll; a first position sensor disposed forward of the driven bonding roll and detecting a position of an edge of the cathode layer; a second position sensor disposed forward of the drive bonding roll and detecting a position of an edge of the embossing portion; and a controller receiving signals, from the first and second position sensors, of the positions of the edges of the embossing portion and the cathode layer. The controller controls operations of the first driver and the second driver according to the positions of the edges of the embossing portion and the cathode layer.

The first and second position sensors may be a vision sensor for capturing an image of the edges of the embossing portion and the cathode layer respectively and outputting the vision data corresponding to the captured images to the controller respectively.

The controller may include: a signal processor analyzing the detected signal of the first position sensor and detecting the position of the edge of the cathode layer and analyzing the detected signal of the second position sensor and detecting the position of the edge of the embossing portion; a calculation processor calculating a position difference between the edge positions of the cathode layer and the embossing portion; and a signal application unit sending control signals to the first and second drivers when the position difference is not within a predetermined range.

When the position difference is not within the predetermined range and it is determined that the position difference is positive, the signal application unit may control the operation of the second driver for the driven bonding roll to be moved away from the drive bonding roll, and the signal application unit may control the operation of the first driver for the driving bonding roll to rotate to a relatively positive rotation position.

When the position difference is not within the predetermined range and it is determined that the position difference is negative, the signal application unit may control the operation of the second driver for the driven bonding roll to be moved away from the drive bonding roll, and the signal application unit may control the operation of the first driver for the driving bonding roll to rotate to a relatively negative rotation position.

The controller may control the operation of the first and second drivers in a state in which the supplying of the electrolyte membrane sheet and the first and second electrode film sheets is stopped.

The manufacturing apparatus may further include a color sensor for sensing the colors of the cathode electrode layer and a portion between the cathode electrode layers, and outputting the detected signals to the controller, and the color sensor disposed on the first position sensor.

The controller may analyze the sensing signal of the color sensor and control the operation of the first and second position sensors.

The first driver may include a servo motor capable of controlling a relative rotational position of the driving bonding roll, and the second driver may include an actuating cylinder for moving the driven bonded roll.

A method of the apparatus for manufacturing a membrane-electrode assembly for a fuel cell, the method according to an exemplary form of the present disclosure may include: (a) unwinding an electrolyte membrane sheet from an electrolyte membrane sheet roll, recovering a protect film attached on an electrolyte membrane, and supplying the electrolyte membrane along a set feed path; (b) unwinding a first electrode film sheet including a first electrode film continuously coated with an anode electrode layer and a second electrode film sheet including a second electrode film coated with a cathode electrode layer with a predetermined gap, and supplying first electrode film sheet and the second electrode film sheet along the set feed path; (c) passing the electrolyte membrane and the first and second electrode film sheets between a driving bonding roll and a driven bonding roll, and transferring the anode electrode layer and the cathode electrode layer of the first and second electrode films to upper and lower surfaces of the electrolyte membrane, respectively; (d) sensing an edge position of the cathode electrode layer through a first position sensor, sensing an edge position of an embossing portion of the driving bonding roll through a second position sensor, and outputting the sensed signals to a controller; and (e) moving the driven bonding roll away from the driving bonding roll and increasing or decreasing a relative rotational position of the driving bonding roll with respect to the driven bonding roll by controls of the controller according to the sensed signals of the first and second position sensors so as to adjust the positions of the anode electrode layer and the cathode electrode layer.

When the electrolyte membrane sheet roll is exhausted in the step (a), a connecting film may be applied to connect first and second extension films attached to ends of the electrolyte membrane and ends of a protect film of the electrolyte membrane sheet with first and second extension films attached to ends of an electrolyte membrane and ends of a protect film of another electrolyte membrane sheet.

In the step (d), the first and second position sensors may simultaneously photograph the edge of the cathode electrode layer and the edge of the embossing portion and outputting the photographed vision data to the controller, and in the step (e), the moving of the electrolyte membrane sheet and the first and second electrode film sheets may be stopped by the controller.

In the step (e), the controller may analyze the received signal from the first position sensor so as to determine a position of the edge of the cathode electrode layer, the controller may analyze the received signal from the second position sensor so as to determine a position of the edge of the embossing portion of anode electrode layer, the controller may calculate a position difference between the edges of the cathode layer and the embossing portion, and the controller may send signals for moving the driven bonding roll and for rotating the drive bonding roll when the position difference is not within a predetermined range.

When the position difference is not within the predetermined range and it is determined that the position difference is positive, the controller may control the operation of the first driver for the driving bonding roll to rotate to a relatively positive rotation position.

When the position difference is not within the predetermined range and it is determined that the position difference is negative, the controller may control the operation of the first driver for the driving bonding roll to rotate to a relatively negative rotation position.

According to the forms of the present disclosure, the transfer positions of the anode electrode layer and the cathode electrode layer may be aligned by adjusting the relative rotation position of the driving bonding roll with respect to the driven bonding roll so that uniformity of transfer of the anode and cathode electrode layers can be improved, the good quality of the membrane-electrode assembly can be provided, and the productivity of the membrane-electrode assembly can be further improved.

In addition, effects obtainable or predicted by the forms of the present disclosure will be directly or implicitly disclosed in the detailed description of the forms of the present disclosure. That is, various effects to be predicted according to the form of the present disclosure will be disclosed in the detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6A:
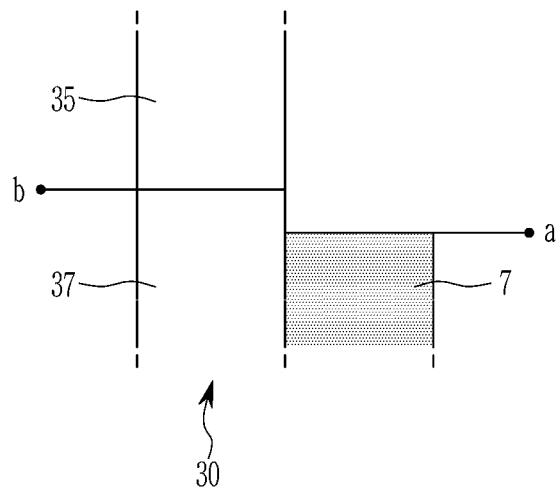
Figure 6B:
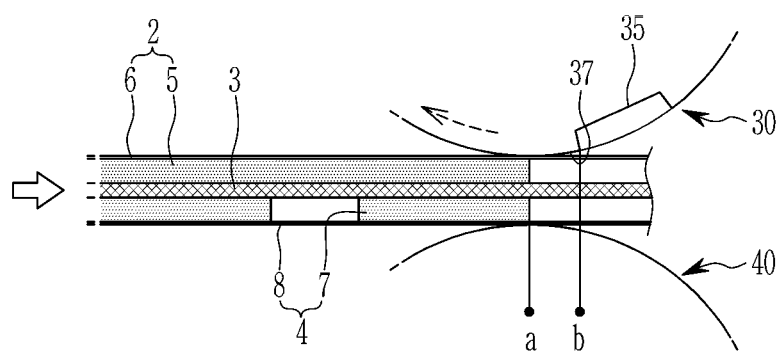
Figure 7:
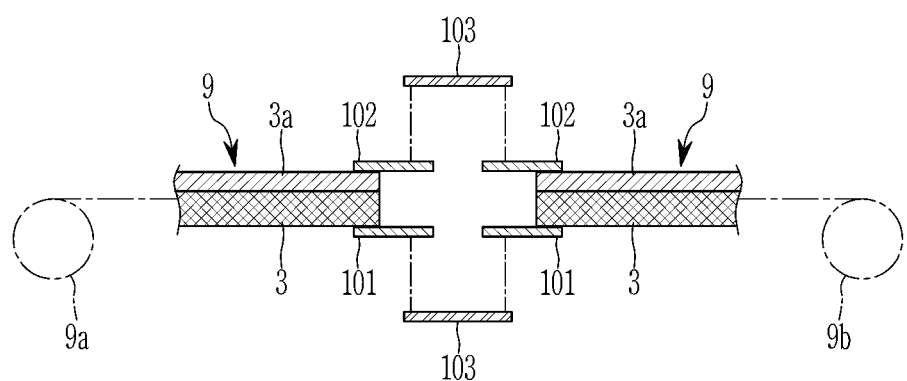

FIGS. 6A and 6B are views showing an example in which an edge position of a cathode electrode layer is positioned behind of a position of an embossed portion according to an exemplary form of the present disclosure; and FIG. 7 is a drawing showing an electrolyte membrane sheet applied to an apparatus for manufacturing a membrane-electrode assembly of a fuel cell according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In order to clearly illustrate the present disclosure, parts not related to the description are omitted, and the same or similar components are denoted by the same reference numerals throughout the specification.

The sizes and thicknesses of the respective components shown in the drawings are arbitrarily shown for convenience of explanation. Therefore, the present disclosure is not necessarily limited to the drawings, and the thicknesses may be enlarged respectively.

In the following detailed description, the names of components are categorized into the first, second, and so on in order to distinguish the components from each other in the same relationship, and are not necessarily limited to the order in the following description.

In addition, unless explicitly described to the contrary, the word "comprise" and variations such as "comprises" or "comprising", will be understood to imply the inclusion of stated elements but not the exclusion of any other elements.

In addition, the terms "unit", "means", "portion", and "member" described in the specification indicate a unit of a comprehensive constituent element for performing at least one function or operation.

Figure 1:
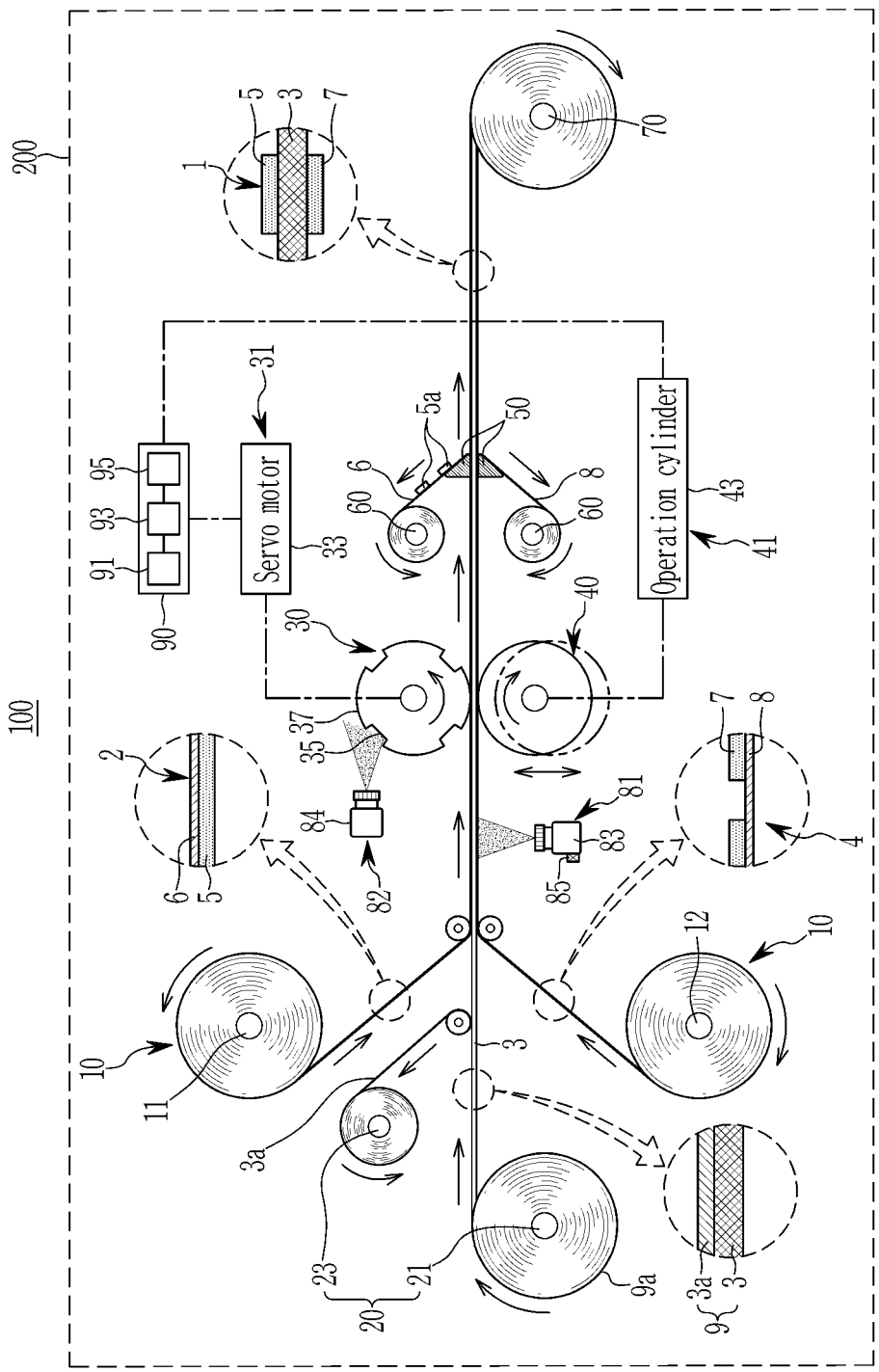
FIG. 1 is a drawing showing a manufacturing apparatus of a membrane-electrode assembly for a fuel cell according to an exemplary form of the present disclosure.

FIG. 1 is a drawing showing a manufacturing apparatus of a membrane-electrode assembly for a fuel cell according to an exemplary form of the present disclosure.

Referring to FIG. 1, an apparatus 100 for manufacturing a membrane-electrode assembly for a fuel cell can be applied to an automation system for automatically and continuously manufacturing parts of unit fuel cells constituting a fuel cell stack.

For example, the apparatus 100 may be applied to manufacture a membrane-electrode assembly 1 including an electrolyte membrane 3 in which an anode electrode layer 5 and a cathode electrode layer 7 are bonded to both surfaces thereof.

The anode electrode layer 5 is bonded to an upper surface of an electrolyte membrane 3 and the cathode electrode layer 7 is bonded to the lower surface of the electrolyte membrane 3 at predetermined gap to manufacture the membrane electrode assembly 1.

Meanwhile, the apparatus 100 for manufacturing a membrane-electrode assembly for a fuel cell can automatically and continuously manufacture the membrane-electrode assembly 1 as a roll-to-roll system.

The roll-to-roll method is an any process of applying coatings, printing, or performing other processes starting with a roll of a flexible material and re-reeling after the process to create an output roll.

The apparatus 100 of the roll-to-roll type has a structure in which the anode electrode layer 5 is transferred to the upper surface of the electrolyte membrane 3 and the cathode layer 7 is transferred to the lower surface of the electrolyte membrane 3 by the roll laminating method and the decal method and the membrane-electrode assembly 1 having a three-layer structure may be manufactured.

Also, the apparatus 100 includes a structure in which the membrane-electrode assembly 1 manufactured as described above is wound in a roll shape.

The apparatus 100 according to one form of the present disclosure comprises an electrode film sheet supply unit 10, an electrolyte membrane sheet supply unit 20, a drive bonding roll 30, a driven bonding roll 40, a separation blade 50, an electrode film rewinder 60, and membrane-electrode assembly rewinder 70.

Each of these components and other components to be described later may be configured in a main frame 200 of the roll-to-roll feeding facility. The main frame 200 supports each component, and may be composed of one frame or a frame divided into two or more frames.

The main frame 200 may include various additional components such as a bracket, a bar, a rod, a plate, a housing, a case, a block, and the like for supporting the components of the apparatus 100.

However, since the above-described various sub-elements are provided for installing the components of the present apparatus 100 to be described below in the main frame 200, and thus the frame 200 is referred to collectively.

The electrode film sheet supply unit 10 is for feeding a first electrode film sheet 2 wound in a roll form and a second electrode film sheet 4 wound in a roll form along a set feed path.

For the sake of understanding, the first electrode film sheet 2 is referred to as an upper electrode film sheet 2 and the second electrode film sheet 4 is referred to as a lower electrode film sheet 4. However, the mounting positions of the first electrode film sheet 2 and the second electrode film sheet 4 are not limited thereto.

Here, the upper electrode film sheet 2 is formed by continuously applying the anode electrode layer 5 on the lower surface of the upper electrode film 6 with reference to the drawing. The lower electrode film sheet 42 is formed by the cathode electrode layer 7 on the upper surface of the lower electrode film 8, and the cathode electrode layer 7 and the next cathode electrode layer 7 are arranged to have a predetermined gap.

The electrode film sheet supply unit 10 includes a first electrode film sheet unwinder 11 for unwinding the first electrode film sheet 2 rolled up in a roll form and feeding along the feed path, and a second electrode film sheet unwinder 12 that unwinds the second electrode film sheet 4 and feeds the along the feed path. The first and second electrode film sheet winders 11 and 12 are rotatably installed in the main frame 200 of the roll-to-roll feeding facility.

The electrolyte membrane sheet supply unit 20 recovers a protect film 3a from a electrolyte membrane sheet 9 having the protect film 3a attached on an upper surface of the electrolyte membrane 3 as shown in the drawing, and supplies the electrolyte membrane 3 between the anode electrode layer 5 of the upper electrode film sheet 2 and the cathode electrode layer 7 of the lower electrode film sheet 4 along the feed path.

The electrolyte membrane sheet supply unit 20 includes an electrolyte membrane sheet unwinder 21 that unwinds the electrolyte membrane sheet 9 from a electrolyte membrane sheet roll 9a and feeds the electrolyte membrane sheet 9 along the feed path, and a protect film rewinder 23 for recovering the protect film 3a and winding it in a roll form. The electrolyte membrane sheet unwinder 21 and the protect film rewinder 23 are rotatably installed in the main frame 200 of the roll-to-roll feeding facility.

The driving bonding roll 30 is installed on the feed path of the electrolyte membrane 3 and the upper and lower electrode films 2 and 4 and is rotatable in one direction, for example in a counterclockwise direction in the drawing through the first driver 31. The driving bonding roll 30 is rotatably mounted on the main frame 200 of the roll-to-roll feeding facility.

The first driver 31 applies a driving force for rotating the driving bonding roll 30 in a counterclockwise and is installed in the main frame 200 of the roll to roll feeding facility. For example, the first driver 31 may include a known servo motor 33 capable of servo control of the driving speed, direction and the like.

Furthermore, the driving bonding roll 30 continuously forms the engraved portion 35 and the embossed portion 37 along the outer circumferential surface. The engraved portions 35 are formed on the outer circumferential surface of the driving bonding roll 30 so as to be spaced apart from each other and the embossing portions 37 are formed between the engraved portions 35.

The engraved portion 35 is formed in a section corresponding to the gap between the cathode electrode layer 7 of the lower electrode film 4 and the embossing portion 37 is formed in a section corresponding to the cathode electrode layer 7.

That is, the engraved portion 35 is a portion that does not press the anode electrode layer 5 of the upper electrode film sheet 2 by an interval corresponding to the gap between the cathode electrode layers 7, and the embossing portion 37 is a portion for pressing the anode electrode layer 5 of the upper electrode film sheet 2 by an interval corresponding to the cathode electrode layer 7.

The driven bonding roll 40 is installed to be movable back and forth from the lower side of the driving bonding roll 30 through the second driver 41 in the vertical direction. The driven bonding roll 40 is installed to be vertically reciprocal on the main frame 200 of the roll-to-roll feeding facility.

The driven bonding roll 40 is in close contact with the driving bonding roll 30 with the electrolyte membrane 3 and the upper and lower electrode film sheets 2 and 4 interposed therebetween and can rotate in the other direction, for example in clockwise direction. The driven bonding roll 40 is rotatably mounted to the main frame 200 of the roll-to-roll feeding facility.

The second driver 41 applies a driving force for reciprocating the driven bonded roll 40 to the driven bonding roll 40, and is installed in the main frame 200 of the roll to roll feeding facility.

For example, the second driver 41 may include a known operation cylinder 43 that provides a reciprocal actuation force in the up and down direction to the driven bonding roll 40. The operation cylinder 43 is operated forward and backward along the vertical direction at a predetermined stroke, and the driven bonded roll 40 can reciprocate in the vertical direction.

The driving and driven bonding rolls 30 and 40 as described above are passed through the electrolyte membrane 3 and the upper and lower electrode film sheets 2 and 4 to press them together, and the anode electrode layer 5 of the upper electrode film 6 and the cathode electrode layer 7 of the lower electrode film 8 can be transferred by roll lamination and decal to the upper and lower surfaces of the electrolyte membrane 3.

The separation blade 50 is disposed on the set feed path rear of the drive bonding roll 30 and driven bonding roll 40 and separating the first electrode film 6 and the anode electrode layer 5, and the second electrode film 8 and the cathode electrode layer 7 from each other;

The separation blade 50 is provided as a delamination blade and is provided on the upper and lower sides of the feed path on the rear side of the driving bonding roll 30 and the driven bonded roll 40 respectively.

The electrode film rewinder 60 is provided to recover the upper electrode film 6 and the lower electrode film 8 separated by the separation blade 50 from the rear side of the drive bonding roll 30 and the driven bonding roll 40.

The electrode film rewinder 60 is provided on the upper and lower sides of the feed path on the side of the separation blade 50 so as to recover and wind the upper electrode film 6 and the lower electrode film 8 respectively. The electrode film rewinder 60 is rotatably installed in the main frame 200 of the roll-to-roll feeding facility.

The electrode membrane rewinder 70 is rotatably installed in the main frame 200 of the roll-to-roll feeding facility for winding the membrane-electrode assembly 1 in which the anode electrode layer 5 and the cathode electrode layer 7 are bonded to the upper and lower surfaces of the electrolyte membrane 3.

According to the above-described manufacturing apparatus 100, the first electrode film sheet 2 wound in a roll form on the first electrode film sheet unwinder 11 is fed through the feed path.

The second electrode film sheet 4 rolled in a roll form on the second electrode film sheet unwinder 12 is fed through the feeding path.

The anode electrode layer 5 is continuously applied to the lower surface of the first electrode film 6 of the first electrode film sheet 2 and the cathode electrode layer 5 is applied on the upper surface of the second electrode film 8 of the second electrode film sheet 4 at the predetermined gap.

The first electrode film 6 provided on the upper side in the drawing is referred to as an upper electrode film 6 and the second electrode film 8 is referred to as a lower electrode film 8 for ease of understanding. However, the positions of the first electrode film 6 and the second electrode film 8 are not limited thereto.

The electrolyte membrane sheet 9 rolled as the electrolyte membrane sheet roll 9a in the electrolyte membrane sheet unwinder 21 of the electrolyte membrane sheet supply unit 20 is fed to the feed path. The electrolyte membrane sheet 9 is supplied to the feed path through the electrolyte membrane sheet unwinder 21 with the protect film 3a attached to the upper surface of the electrolyte membrane 3.

The protect film 3a of the electrolyte membrane sheet 9 is recovered through the protect film rewinder 23 of the electrolyte membrane sheet supply unit 20 and wound in a roll form.

The electrolyte membrane 3 of the electrolyte membrane sheet 9 is supplied along the feed path between the anode electrode layer 5 of the upper electrode film sheet 2 and the cathode electrode layer 7 of the lower electrode film sheet 4.

The driving bonding roll 30 rotates at a rotational speed set in the counterclockwise direction by the operation of the first driver 31 and the driven bonding roll 40 is moved in the upward direction by the operation of the second driver 41.

In this state, the electrolyte membrane 3 and the upper electrode film sheet 2 and the lower electrode film sheet 4 interposing the electrolyte membrane 3 are sandwiched between the driving and driven bonding rolls 30 and 40.

As the driving bonding roll 30 rotates in the counterclockwise direction, the driven bonded roll 40 is rotated in the clockwise direction interposing the electrolyte membrane 3 and the upper and lower electrode film sheets 2 and 4 therebetween.

Therefore, the electrolyte membrane 3 and the upper and lower electrode film sheets 2, 4 are being pressed through the driving and driven bonding rolls 30 and 40. And thus the anode electrode layer 5 of the upper electrode film sheet 5 is transferred to the upper surface of the electrolyte membrane 3 and the cathode electrode layer 7 of the lower electrode film sheet 4 is transferred to the lower surface of the electrolyte membrane 3.

That is, the anode electrode layer 5 of the upper electrode film sheet 2 and the cathode electrode layer 7 of the lower electrode film sheet 4 are laminated on the upper and lower surfaces of the electrolyte membrane 3 in a roll lamination and decal method respectively and the anode electrode layer 5 and the cathode electrode layer 7 are bonded to the upper and lower surfaces of the electrolyte membrane 3 respectively through the drive bonding roll 30 and the driven bonding roll 40.

While the engraved portions 35 of the driving bonding roll 30 do not squeeze the anode electrode layer 5 of the upper electrode film sheet 2 by an interval corresponding to the interval between the cathode electrode layers 7, the embossing portion 37 presses the anode electrode layer 5 of the upper electrode film sheet 2 by a section corresponding to the cathode electrode layer 7 and transfers the anode electrode layer 5 onto the upper surface of the electrolyte membrane 3.

In this state, the upper electrode film 6 and the lower electrode film 8 are separated from the upper and lower electrode film sheets 2 and 4 respectively at the rear side of the drive bonding roll 30 and the driven bonding roll 40 through the separation blade 50. The upper electrode film 6 and the lower electrode film 8 separated as described above are wound around the electrode film rewinder 60 and recovered.

The anode electrode layer 5 at the position corresponding to the engraved portion 35 is not transferred to the electrolyte film 3 and the excess portion 5a is transferred and recovered to the electrode film rewinder 60 together with the upper electrode film 6. The membrane electrode assembly 1 to which the anode electrode layer 5 and the cathode electrode layer 7 are bonded to the upper and lower surfaces of the electrolyte membrane 3 is wound on the electrode membrane rewinder 70 at the end side of the feed path.

On the other hand, the feeding speed difference between the upper and lower electrode film sheets 2 and 4 fed along the feed path, the pitch difference between the cathode electrode layers 7 applied to the lower electrode film 8 of the lower electrode film sheet 4 may impede precisely matching the transfer positions of the anode and cathode electrode layers 5 and 7 with respect to the electrolyte membrane 3.

Therefore, in the form of the present disclosure, a manufacturing apparatus 100 for a fuel cell membrane-electrode assembly capable of automatically aligning the transfer positions of the anode and cathode electrode layers 5, 7 with respect to the upper and lower surfaces of the electrolyte membrane 3 with a simple configuration.

The apparatus 100 for manufacturing a membrane electrode assembly for a fuel cell according to an exemplary form of the present disclosure moves the driven bonded roll 40 away from driving bonding roll 30, for example in the vertical direction, through the operation of the second driver 41 according to the distance between the cathode electrode layers 7 and relatively increases or decreases the rotational position of the driving bonding roll 30 through the operation of the first driver 31.

Specifically, the apparatus 100 further includes first and second position sensors 81 and 82 for controlling the first driver 31 of the driving bonding roll 30 and the second driver 41 of the driven bonding roll 40.

The first position sensor 81 is installed on the main frame 200 of the roll-to-roll feeding facility on the front side of the driving and driven bonding rolls 30 and 40. The first position sensor 81 senses an edge position of the cathode electrode layer 7 of the lower electrode film sheet 4 supplied along the feed path through the electrode film sheet supply unit 10 and transmits the detection signal to the controller 90.

The first position sensor 81 includes a vision sensor 83 for capturing an image of the edge of the cathode electrode layer 7 and outputting the vision data to the controller 90.

The second position sensor 82 is installed on the main frame 200 of the roll-to-roll feeding facility on the front side of the driving bonding roll 30. The second position sensor 82 senses an edge position of the embossing portion 37 of the driving bonding roll 30 and outputs the sensed signal to the controller 90.

The second position sensor 82 includes a vision sensor 84 for shooting the edge of the embossing portion 37 and for outputting the vision data to the controller 90.

Since the first and second position sensors 81 and 82 may be constructed as a known vision sensor widely known in the art, a detailed description thereof will be omitted herein.

The first and second position sensors 81 and 82 simultaneously photograph the edge of the cathode electrode layer 7 and the edge of the embossed portion 37 respectively and the operation of the vision shooting can be controlled through the controller 90.

Further, a color sensor 85 for sensing a color between the cathode electrode layers 7 and outputting the detection signal to the controller 90 may be provided on a side of the first position sensor 81.

The color sensor 85 senses the white color between the cathode electrode layers 7 and the black color of the cathode electrode layer 7 which is opposite to the white color, and may be equipped with a color sensor known in the art do.

The controller 90 may receive a sensing signal from the color sensor 85 and may analyze the sensing signal to control the operation of the first and second position sensors 81 and 82. For example, the controller 90 applies a control signal to the first and second position sensors 81 and 82 when sensing the black color of the cathode electrode layer 7 through the color sensor 85. The first and second position sensors 81 and 82 simultaneously capture the edge of the cathode electrode layer 7 and the edge of the embossing portion 37.

The controller 90 as described above may be implemented as one or more control processors that operate according to a set program as a controller for controlling the overall operation of the apparatus 100, and may include a series of instructions to perform.

The controller 90 analyzes the sensing signals supplied from the first and second position sensors 81 and 82 and outputs the sensed signals to the first driver 31 and the second driver 41 according to the edge positions of the embossing portions 37 and the cathode electrode layer 7.

The control of the first and second drivers 31 and 41 by the controller 90 may be performed while the transfer of the electrolyte membrane sheet 9 and the upper and lower electrode film sheets 2 and 4 is stopped.

The controller 90 includes a signal processor 91, a calculation processor 93, and a signal application unit 95.

The signal processor 91 analyzes the sensing signal of the first position sensor 81 and detects the edge position of the cathode electrode layer 7 to be matched with the edge of the embossing unit 37. And the signal processor 91 analyzes the sensing signal of the second position sensor 82 and detects the edge position of the embossing unit 37 to be matched with the edge of the cathode electrode layer 7.

The calculation processor 93 calculates a difference value between the edge position of the cathode electrode layer 7 and the edge position of the embossing portion 37.

The signal application unit 95 applies a control signal to the first and second drivers 31 and 41 when it is determined that the position difference value calculated by the calculating processor 93 does not satisfy a predetermined reference range.

The signal application unit 95 applies a control signal to the second driver 41 for the driven bonding roll 40 to be moved away from the drive bonding roll 30 when it is determined that the position difference value is not within the predetermined range and it is determined that the position difference is positive (+).

In this case, the signal application unit 92 controls the operation of the first driver 31 for the driving bonding roll 30 to rotate to a relatively positive rotation position.

When the position difference is not within the predetermined range and it is determined that the position difference is negative (−), the signal application unit 95 controls the operation of the second driver 41 for the driven bonding roll 40 to be moved away from the drive bonding roll 30.

In this case, the signal application unit 95 controls the operation of the first driver 31 for the driving bonding roll 30 to rotate to a relatively negative rotation position.

Hereinafter, the operation of the apparatus 100 and a method for manufacturing a membrane-electrode assembly according to one form of present disclosure will be described in detail referring to FIG. 1 and the accompanying drawings.

Figure 2:
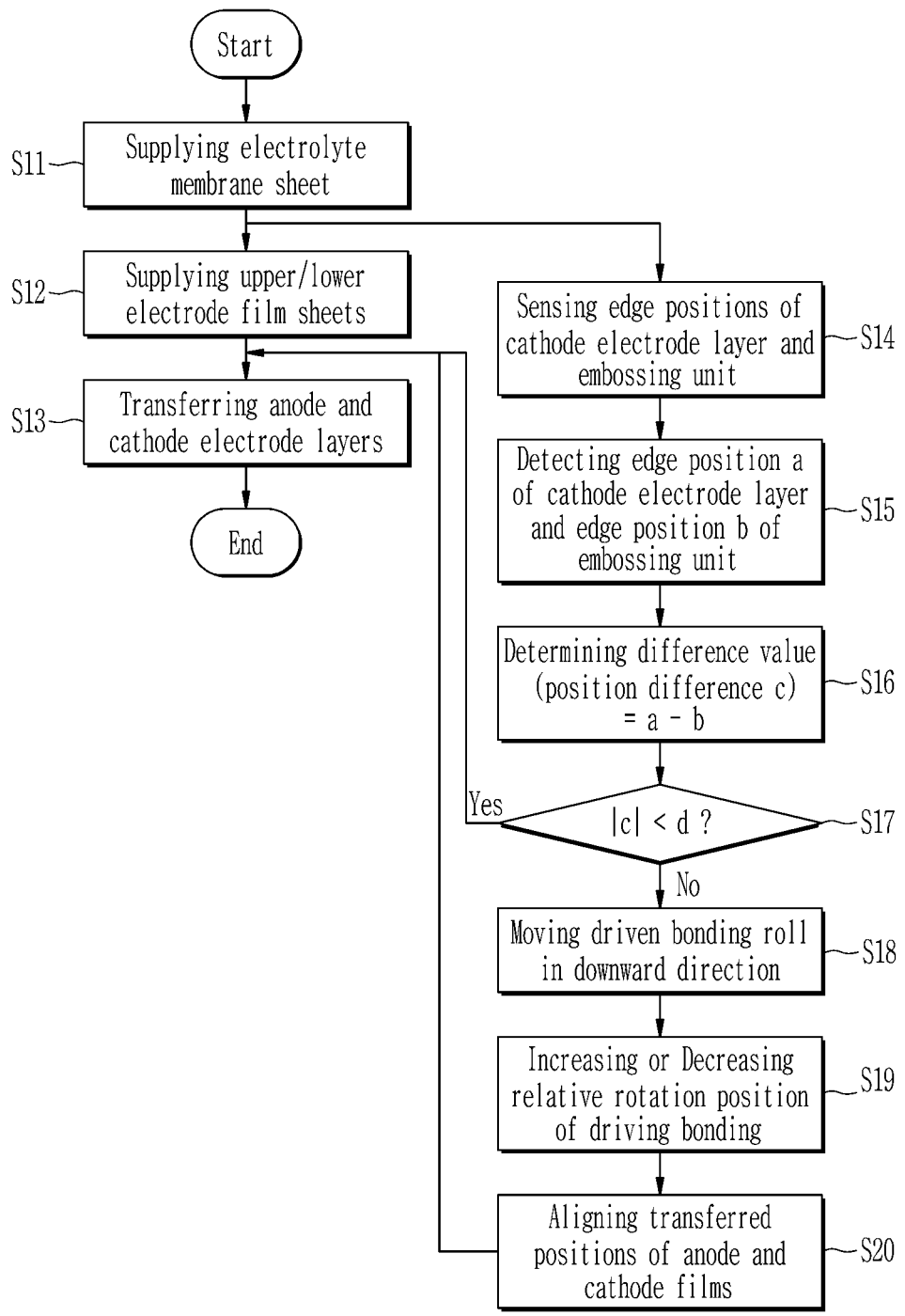
FIG. 2 is a flow-chart showing a method for a manufacturing a membrane-electrode assembly for a fuel cell according to an exemplary form of the present disclosure.

FIG. 2 is a flow-chart showing a method for a manufacturing a membrane-electrode assembly for a fuel cell according to an exemplary form of the present disclosure and FIG. 3 to FIG. 6B are drawings showing operations of an apparatus for a manufacturing a membrane-electrode assembly and a manufacturing method using the apparatus for an apparatus for manufacturing a membrane-electrode assembly of a fuel cell according to an exemplary form of the present disclosure.

Figure 3:
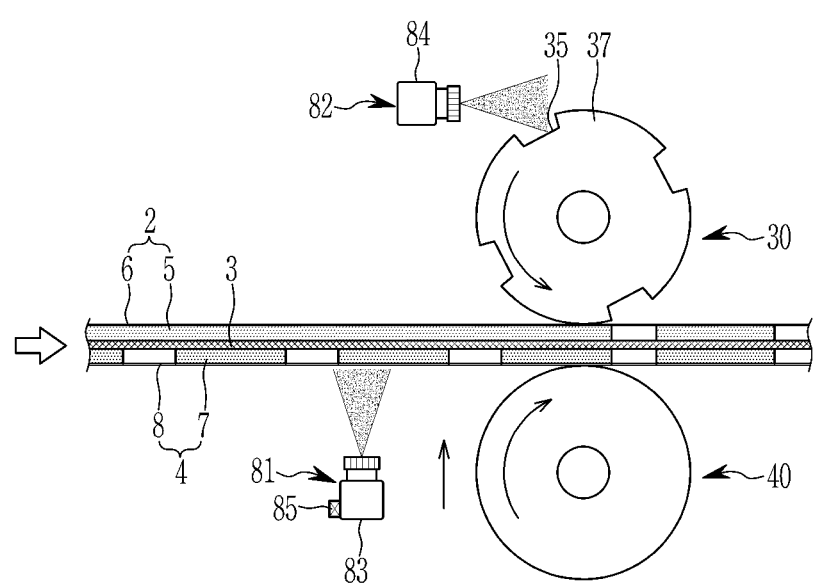
FIG. 3 is a drawing showing first and second position sensors applied to a manufacturing apparatus of a membrane-electrode assembly for a fuel cell according to an exemplary form of the present disclosure.
Figure 4A:
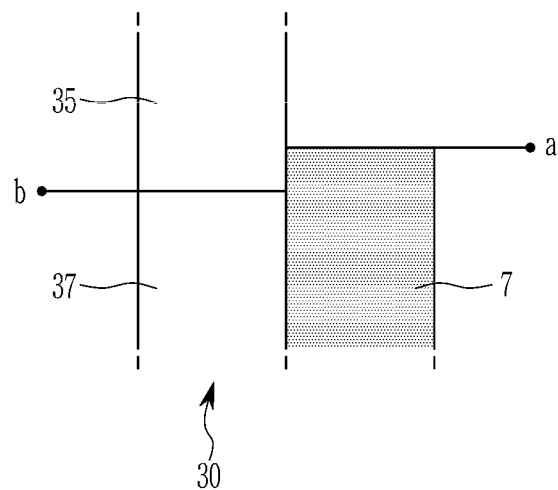
FIGS. 4A and 4B are views showing an example in which an edge position of a cathode electrode layer is positioned ahead of a position of an embossed portion according to an exemplary form of the present disclosure.
Figure 4B:
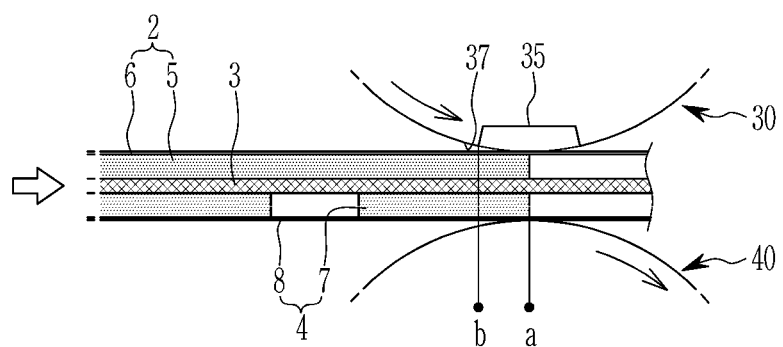

Referring to FIG. 1 to FIG. 3, the electrolyte membrane sheet 9 is unwound from the electrolyte membrane sheet roll 9a wrapped in a roll form and the protect film 3a is recovered and the electrolyte membrane 3 is supplied to the set feed path (S11).

At the same time, the upper electrode film sheet 2, on which the anode electrode layer 5 is continuously applied, and the lower electrode film sheet 4, on which the cathode electrode layers 7 are coated with spaced apart are unwound and supplied to the upper and lower sides of the electrolyte membrane 3 along the feed path (S12).

The electrolyte membrane 3 and the upper and lower electrode film sheets 2 and 4 are passed between the driving and driven bonding rolls 30 and 40 and the anode electrode layer 5 and the cathode electrode layer 7 are transferred onto the upper and lower surfaces of the electrolyte membrane 3 respectively (S13).

Since the processes of S11, S12 and S13 are the same as those of the membrane-electrode assembly manufacturing apparatus 100 for a fuel cell having the basic structure as described above, a detailed description thereof will be omitted.

In this process, the edge position of the cathode electrode layer 7 is sensed through the first position sensor 81 and the sensed signal is output to the controller 90. The edge position of the embossing portion 37 of the driving bonding roll 30 is sensed through the second position sensor 82 and the sensed signal is output to the controller 90 (S14).

In the above process, the color sensor 85 detects the white color between the cathode electrode layers 7 and the black color of the cathode electrode layer 7 which is opposite to the white color, and outputs the detection signal to the controller 90.

The controller 90 analyzes the sensing signal of the color sensor 85 to control the operation of the first and second position sensors 81 and 82, and applies an operation control signal to the first and second position sensors 81 and 82 when sensing the black color of the cathode electrode layer 7 through the color sensor 85.

The first and second position sensors 81 and 82 simultaneously shoot the edge of the cathode electrode layer 7 and the edge of the embossing portion 37 and output the vision data to the controller 90.

The controller 90 analyzes the detection signal of the first position sensor 81 through the signal processor 91 to detect the edge position a of the cathode electrode layer 7 to be matched with the edge of the embossing portion 37. And the controller 90 analyzes the sensing signal of the second position sensor 82 through the signal processor 91 to detect the edge position b of the embossing unit 37 to be matched with the edge of the cathode electrode layer 7 (S15).

The controller 90 determines the difference value (position difference c) between the edge position a of the cathode electrode layer 7 and the edge position b of the embossing portion 37 through the calculation processor 93 (S16).

The controller 90 determines whether the position difference c for the edge position value a of the cathode electrode layer 7 and the edge position value b of the boss portion 37 satisfy the preset reference ranged (S17).

Here, the reference range d can be defined as the allowable position difference range between the cathode electrode layer 7 and the embossing portion 37.

If it is determined that the position difference c is within the predetermined range d, the above-described series of steps S11, S12, and S13 are performed.

However, in the step S17, if the position difference c is not within the predetermined range d and it is determined that the position difference is positive (+), the controller 90 applies a control signal to the second driver 41.

Figure 5:
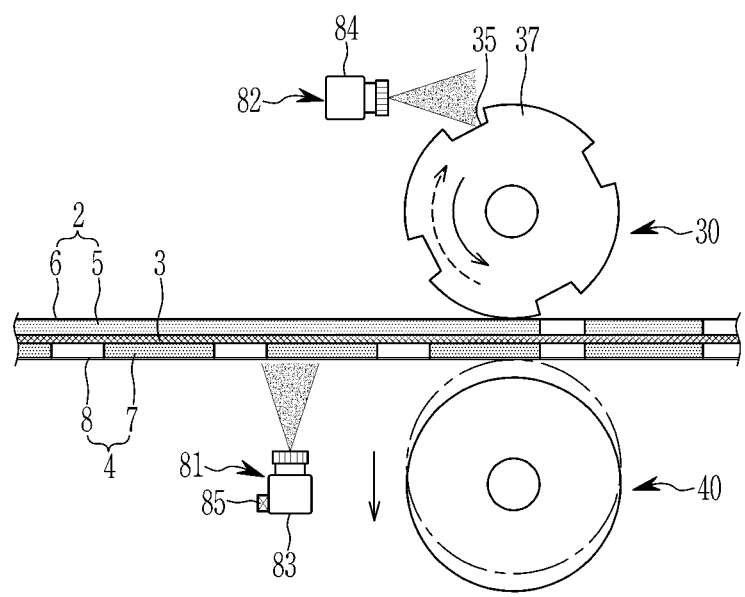
FIG. 5 shows an operation of a driven bonding roll of a manufacturing apparatus of a membrane-electrode assembly for a fuel cell according to an exemplary form of the present disclosure.

Then, as shown in FIG. 5, the second driver 41 receives the control signal from the controller 90 and moves the driven bonding roll 40 in the downward direction (S18).

In this case, the controller 90 applies a control signal to the first driver 31. The first driver 31 receives the control signal from the controller 90 and increases the relative rotation position of the driving bonding roll 30 by a rotation amount corresponding to the position difference value c as shown in solid line in the drawing (S19).

Conversely, as shown in FIGS. 6A and 6B, if the position difference c is not within the predetermined range d and it is determined that the position difference is negative (−), the controller 90 applies a control signal to the second driver 41.

Then, as shown in FIG. 5, the second driver 41 receives the control signal from the controller 90 and moves the driven bonding roll 40 in the downward direction (S18).

In this case, the controller 90 applies a control signal to the first driver 31. The first driver 31 receives the control signal from the controller 90 and decreased the relative rotation position of the driving bonding roll 30 by a rotation amount corresponding to the position difference value c as shown in dotted line in the drawing (S19).

Here, the above-described steps S18 and S19 are performed while the feeding of the upper and lower electrode sheets 2, 4 and the electrolyte membrane sheet 9 is stopped.

As described above, when the position difference c for the edge position a of the cathode electrode layer 7 and the edge position b of the embossing portion 37 do not satisfy the reference range, the driven boding roll 40 is moved downward direction and the relative rotational position of the drive boding roll 30 is increased or decreased.

Therefore, the transfer positions of the anode electrode layer 5 and the cathode electrode layer 7 with respect to the electrolyte membrane 3 can be aligned to match predetermined positions according to the intervals of the cathode electrode layers 7 (S20).

When the transfer position of the anode electrode layer 5 and the cathode electrode layer 7 with respect to the electrolyte membrane 3 is aligned through the above process, the controller 90 determines the position difference value c satisfy the reference range d.

Accordingly, the controller 90 applies a control signal to the second driver 41. The second driving source 41 receives the control signal from the controller 90 and moves the driven bonding roll 40 in the upward direction. And then, the above-described series of processes (S11, S12, and S13) are performed.

According to exemplary forms of the present disclosure, it is possible to automatically align the transfer positions of the anode electrode layer 5 and the cathode electrode layer 7 with respect to the electrolyte membrane 3 by increasing or decreasing the rotational position of the driving bonding roll 30.

Also, it is possible to prevent or inhibit deterioration of the transfer uniformity of the anode and cathode electrode layers 5 and 7 due to the distribution of the pitch or gap between the cathode electrode layers 7 applied to the lower electrode sheet 8, and quality can be enhanced, and the productivity of the membrane-electrode assembly 1 can be improved.

FIG. 7 is a drawing showing an electrolyte membrane sheet applied to an apparatus for manufacturing a membrane-electrode assembly of a fuel cell according to an exemplary form of the present disclosure.

Referring to FIG. 1 and FIG. 7, in both ends of the electrolyte membrane sheet 9, a first extension film 101 is attached to both ends of the electrolyte membrane 3 respectively and a second extension film 102 is attached to both ends of the protect film 3*a* respectively.

In one form, the electrolyte membrane sheet 9 is a two-layer in which extension films 101 and 102 are attached to both ends of the electrolyte membrane 3 and the protect film 3*a*, respectively.

The first extension film 101 may be adhered to both ends of the electrolyte membrane 3 as a predetermined length and the second extension film 102 having a predetermined length may be adhered to both ends of the protect film 3*a* through an adhesive agent.

When the electrolyte membrane sheet roll 9*a* is exhausted, a connecting film 103 is applied to connect first and second extension films 101 and 102 attached to ends of the electrolyte membrane 3 and ends of the protect film 3*a* of the electrolyte membrane sheet roll 9*a* with first and second extension films 101 and 102 attached to ends of an electrolyte membrane 3 and ends of the protect film 3*a* of another electrolyte membrane sheet roll 9*b*.

Hereinafter, the electrolyte membrane sheet roll 9*a* where the electrolyte membrane sheet 9 is exhausted as described above can be defined as a working roll, and the new electrolyte membrane sheet roll 9*b* can be defined as a preliminary roll.

The connecting film 103 as described above is adhered to the first extension film 101 at the end of the working roll 9*a* and the first extension film 101 at the end of the preliminary roll 9*b* with an adhesive.

Also, the connecting film 103 is adhered to the second extension film 102 at the end of the working roll 9*a* and the second extension film 102 at the end of the preliminary roll 9*b* with an adhesive.

When the electrolyte membrane sheet 9 of the working roll 9*a* is exhausted, the working roll 9*a* mounted on the electrolyte membrane sheet unwinder 21 of the electrolyte membrane sheet supply unit 20 is replaced with the preliminary roll 9*b*.

In the above-described process, the first and second extension films 101 and 102 attached to the ends of the electrolyte membrane sheet 9 of the electrolyte membrane sheet roll 9*a* and the first and second extended films 101 and 102 attached to the end of the electrolyte membrane sheet 9 of the electrolyte membrane sheet roll 9*b* are connected through the connecting film 103 respectively.

Thus, the end of the electrolyte membrane 3 of the working roll 9*a* and the end of the electrolyte membrane 3 of the preliminary roll 9*b* are connected through the first extension film 101 and the connecting film 103.

And the end of the protect film 3*a* of the working roll 9*a* and the end of the protect film 3*a* of the preliminary roll 9*b* are connected through the second extension film 102 and the connecting film 103.

Thus, the end portion of the electrolyte membrane sheet 9 of the working electrolyte membrane raw material roll 9*a*, which is the working roll, and the end portion of the electrolyte membrane sheet 9 of the new electrolyte membrane sheet 9*a* can be easily connected through the first and second extension films 101 and 102 and the connection film 103.

Further, when replacing the working roll with the preliminary roll, since the protective film 3*a* of the preliminary roll is connected to the protective film 3*a* of the working roll through the second extended film 102 and the connecting film 103, the process of manually connecting the protective film 3*a* of the preliminary roll to the protective film rewinder 23 of the electrolyte membrane sheet supply unit 20 can be eliminated.

That is, an electrolyte membrane composed of a general single-layer extension film should be connected to an electrolyte membrane protection film winding roll by manual peeling of the electrolyte membrane protection film after the extension film is pulled out during line operation.

However, in the forms of the present disclosure, the electrolyte membrane having the extension film of the two-layer structure is automatically peeled by each line, that is, the feed path of the electrolyte membrane 3 and the feed path of the protection film 3*a*, so that no additional work is required to connect the sheet to the protection film winding roll.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 1: membrane-electrode assembly | 2: first electrode film sheet |
| 3: electrolyte membrane | 3a: protect film |
| 4: second electrode film sheet | 5: anode layer |
| 6: first electrode film | 7: cathode layer |
| 8: second electrode film | 9: electrolyte membrane sheet |
| 9a, 9b: electrolyte membrane sheet roll | |
| 10: electrode film sheet supply unit | |
| 11: first electrode film sheet unwinder | |
| 12: second electrode film sheet unwinder | |
| 20: electrolyte membrane sheet supply unit | |
| 21: electrolyte membrane sheet unwinder | |
| 23: protect film rewinder | 30: drive bonding roll |
| 31: first driver | 33: servo motor |
| 35: engraved portion | 37: embossing portion |
| 40: driven bonding roll | 41: second driver |
| 43: operation cylinder | 50: separation blade |
| 60: electrode film rewinder | |
| 70: membrane-electrode assembly rewinder | |
| 81: first position sensor | 82: second position sensor |
| 83, 84: vision sensor | 85: color sensor |
| 90: controller | 91: signal processor |
| 93: calculation processor | 95: signal application unit |
| 100: apparatus for manufacturing a membrane-electrode assembly of a fuel cell | |
| 101: first extension film | 102: second extension film |
| 103: connecting film | 200: main frame |

What is claimed is:

1. A method of the apparatus for manufacturing a membrane-electrode assembly for a fuel cell, the method comprising:
   (a) unwinding an electrolyte membrane sheet from an electrolyte membrane sheet roll, recovering a protect film attached on an electrolyte membrane, and supplying the electrolyte membrane along a set feed path;

(b) unwinding a first electrode film sheet including a first electrode film continuously coated with an anode electrode layer and a second electrode film sheet including a second electrode film coated with a cathode electrode layer with a predetermined gap, and supplying the first electrode film sheet and the second electrode film sheet along the set feed path;

(c) passing the electrolyte membrane and the first and second electrode film sheets through between a driving bonding roll and a driven bonding roll, and transferring the anode electrode layer and the cathode electrode layer of the first and second electrode films to upper and lower surfaces of the electrolyte membrane, respectively;

(d) sensing an edge position of the cathode electrode layer through a first position sensor, sensing an edge position of an embossing portion of the driving bonding roll through a second position sensor, and outputting sensed signals to a controller; and (e) moving the driven bonding roll away from the driving bonding roll and increasing or decreasing a relative rotational position of the driving bonding roll with respective to the driven bonding roll by controls of the controller based on the sensed signals of the first and second position sensors so as to adjust the positions of the anode electrode layer and the cathode electrode layer.

2. The method of claim 1, wherein:
when the electrolyte membrane sheet roll is exhausted in the step (a),
a connecting film is applied to connect first and second extension films attached to ends of the electrolyte membrane and ends of a protect film of the electrolyte membrane sheet with first and second extension films attached to ends of the electrolyte membrane and ends of a protect film of another electrolyte membrane sheet.

3. The method of claim 1, wherein:
in the step (d), the first and second position sensors are configured to simultaneously photograph an edge of the cathode electrode layer and an edge of the embossing portion and to output the photographed vision data to the controller, and
in the step (e), the controller is configured to stop the moving of the electrolyte membrane sheet and the first and second electrode film sheets.

4. The method of claim 1, wherein:
in the step (e), the controller is configured to:
analyze the received signals from the first position sensor so as to determine the edge position of the cathode electrode layer,
analyze the received signals from the second position sensor so as to determine the edge position of the embossing portion,
calculate a position difference between the edge positions of the cathode electrode layer and the embossing portion, and
send signals for moving the driven bonding roll and for rotating the drive bonding roll when the position difference is not within a predetermined range.

5. The method of claim 4, wherein:
when the position difference is not within the predetermined range and it is determined that the position difference is positive,
the controller controls the operation of the first driver for the driving bonding roll to rotate to a relatively positive rotation position.

6. The method of claim 4, wherein:
when the position difference is not within the predetermined range and it is determined that the position difference is negative,
the controller controls the operation of the first driver for the driving bonding roll to rotate to a relatively negative rotation position.

* * * * *